US011886058B2

(12) United States Patent
Scofield et al.

(10) Patent No.: US 11,886,058 B2
(45) Date of Patent: Jan. 30, 2024

(54) OPTICAL ISOLATOR

(71) Applicant: ROCKLEY PHOTONICS LIMITED, Altrincham (GB)

(72) Inventors: Adam Scofield, Los Angeles, CA (US); Gerald Byrd, Shadow Hills, CA (US); Aaron John Zilkie, Pasadena, CA (US)

(73) Assignee: Rockley Photonics Limited, Altrincham (GB)

( * ) Notice: Subject to any disclaimer, the term of this patent is extended or adjusted under 35 U.S.C. 154(b) by 42 days.

(21) Appl. No.: 17/595,702

(22) PCT Filed: May 22, 2020

(86) PCT No.: PCT/EP2020/064290
§ 371 (c)(1),
(2) Date: Nov. 22, 2021

(87) PCT Pub. No.: WO2020/239628
PCT Pub. Date: Dec. 3, 2020

(65) Prior Publication Data
US 2022/0244584 A1    Aug. 4, 2022

Related U.S. Application Data

(60) Provisional application No. 62/852,758, filed on May 24, 2019.

(51) Int. Cl.
*G02F 1/09* (2006.01)
*G02F 1/095* (2006.01)
*G02F 1/01* (2006.01)

(52) U.S. Cl.
CPC .......... *G02F 1/0955* (2013.01); *G02F 1/0136* (2013.01)

(58) Field of Classification Search
CPC .............................. G02F 1/0955; G02F 1/0136
See application file for complete search history.

(56) References Cited

U.S. PATENT DOCUMENTS 4,615,582 A * 10/1986 Lefevre .................. G02F 1/09
385/12
4,671,658 A * 6/1987 Shaw .................... G01C 19/72
356/460

(Continued)

FOREIGN PATENT DOCUMENTS

| CN | 111247478 A | * | 6/2020 | ............. G02B 6/126 |
| WO | WO 2019/038477 A1 | | 2/2019 | |
| WO | WO-2019038477 A1 | * | 2/2019 | ............. G02B 6/126 |

OTHER PUBLICATIONS

Hyundai Park, John P. Mack, Daniel J. Blumenthal, and John E. Bowers, "An integrated recirculating optical buffer," Opt. Express 16, 11124-11131 (2008) (Year: 2008).*

(Continued)

*Primary Examiner* — Peter Radkowski
(74) *Attorney, Agent, or Firm* — Lewis Roca Rothgerber Christie LLP

(57) ABSTRACT

An optical isolator on a silicon photonic integrated circuit. The optical isolator comprising: a polarization splitter; a polarization rotator; and a Faraday rotator. The Faraday rotator comprises: one or more magnets providing a magnetic field; and a silicon spiral delay line. The silicon spiral delay line being formed from a silicon waveguide shaped into a spiral region having no built-in phase shifters and a central region within the spiral region. The central region having no more than a total of 180 degree of phase shifters.

20 Claims, 2 Drawing Sheets

(56) References Cited

U.S. PATENT DOCUMENTS

| | | | | |
|---|---|---|---|---|
| 4,733,938 | A * | 3/1988 | Lefevre | G01R 33/0322 |
| | | | | 385/11 |
| 7,106,918 | B2 * | 9/2006 | Bita | G02B 6/1225 |
| | | | | 252/62.51 R |
| 7,228,015 | B2 * | 6/2007 | Watts | G02B 6/2726 |
| | | | | 385/11 |
| 7,995,893 | B2 * | 8/2011 | Bi | G02F 1/0955 |
| | | | | 385/11 |
| 11,002,911 | B2 * | 5/2021 | Sodagar | G02B 6/2746 |
| 11,506,919 | B2 * | 11/2022 | Cherchi | G02F 1/0955 |
| 2005/0008308 | A1 * | 1/2005 | Bita | B82Y 20/00 |
| | | | | 385/123 |
| 2006/0013076 | A1 * | 1/2006 | Kishimoto | G02F 1/093 |
| | | | | 369/13.01 |
| 2006/0018584 | A1 * | 1/2006 | Watts | G02B 6/2766 |
| | | | | 385/11 |
| 2006/0222283 | A1 * | 10/2006 | Salib | G02F 1/0955 |
| | | | | 385/11 |
| 2009/0136191 | A1 * | 5/2009 | Bi | G02F 1/0036 |
| | | | | 385/11 |
| 2012/0163751 | A1 * | 6/2012 | Cho | G02B 6/126 |
| | | | | 385/11 |
| 2018/0196197 | A1 * | 7/2018 | Sodagar | G02B 6/1228 |
| 2020/0192134 | A1 * | 6/2020 | Cherchi | G02F 1/0955 |
| 2022/0214500 | A1 * | 7/2022 | Harjanne | G02B 6/126 |

OTHER PUBLICATIONS

International Search Report and Written Opinion of the International Searching Authority, dated Sep. 10, 2020, Corresponding to PCT/EP2020/064290, 9 pages.

Asraf, S. et al., "Novel configuration for an enhanced and compact all-fiber Faraday rotator with match birefringence", Optics Express, Jul. 25, 2017, pp. 18643-18655, vol. 25, No. 16, Optical Society of America.

Jalas, D. et al., "Faraday rotation in silicon waveguides", 2017, pp. 141-142, IEEE.

U.K. Intellectual Property Office Search and Examination Report, dated Dec. 2, 2020, for Patent Application No. GB2007656.8, 5 pages.

* cited by examiner

OPTICAL ISOLATOR

CROSS-REFERENCE TO RELATED APPLICATION(S)

This application is a U.S. national stage entry, under 35 U.S.C. § 371, of International Application Number PCT/EP2020/064290, filed on May 22, 2020, which claims priority to and the benefit of U.S. Provisional Patent Application No. 62/852,758, filed May 24, 2019. The entire contents of all of the applications identified in this paragraph are incorporated herein by reference.

FIELD OF THE INVENTION

The present invention relates to an optical isolator and a Faraday rotator.

BACKGROUND OF THE INVENTION

Optical isolators are often necessary in systems that have strong back reflection into the laser(s) and cannot use reflection tolerant lasers.

Isolators are typically made using a combination of birefringent materials, polarizing films, and magneto-optic materials.

Integration of these with silicon photonics is still an outstanding challenge.

Silicon itself has a small faraday rotation similar to magneto-optic materials.

This requires extremely small TE/TM modal birefringence and is only possible in large (3 um) waveguide platform.

An isolator in silicon is thought to typically involve the following components:
  Polarization splitter
  Polarization rotator—for example, this could take the form of a 45 degree rotator that is reciprocal (i.e. no Faraday rotation)
  Faraday rotator for example, this could take the form of a long (5-15 cm) waveguide in a magnetic field of, for example, 0.1-1 Tesla which gives a non-reciprocal 45 degree rotation Currently known designs make the Faraday rotator in a single spiral delay line to be placed in a uniform magnetic field.

This requires two 90 degree phase rotators at each turn of the spiral so that Faraday rotation adds constructively. This many 90 degree phase rotators is thought to be impractical due to fabrication error and is likely to lead to poor performance.

SUMMARY OF INVENTION

Accordingly, in a first aspect, embodiments of the present invention provide an optical isolator on a silicon photonic integrated circuit, the optical isolator comprising:
  a polarization splitter;
  a polarization rotator; and
  a Faraday rotator;
wherein the Faraday rotator comprises:
  one or more magnets for providing a magnetic field; and
  a silicon spiral delay line, the silicon spiral delay line formed from a silicon waveguide shaped into a spiral region having no built-in phase shifters, and a central region within the spiral region, the central region having no more than a total of 180° of phase shifters.

Such an optical isolator can be more readily fabricated, and further produce a higher level of optical isolation than seen previously. Some examples of the present invention can achieve optical isolation at a level in excess of 7 dB, 14 dB, and 29 dB.

The optical isolator may have any one, or any combination insofar as they are compatible, of the following optional features.

The one or more magnets may comprise two U-shaped magnets positioned in an opposing relationship to generate the magnetic field between their respective ends.

The central region may comprise two bends, each bend comprising a 90° phase shifter.

Each loop of the spiral region of the silicon spiral delay line may have a rectangular shape formed of four straight portions and four curved corners.

The one or more magnets may be positioned such that the field lines of the magnetic field follow the path of the waveguide within the spiral region. Each loop of the spiral region of the silicon spiral delay line may have a rectangular shape formed of four straight portions and four curved corners, and the one or more magnets may comprise four magnets, each magnet being located at a corner of the rectangle shape.

The central region may comprise no phase shifters.

The silicon spiral delay line may be formed of a 3 μm silicon waveguide.

The polarization rotator may be a 45° polarization rotator.

The optical isolator may further comprise an additional polarization splitter. The polarization splitter may be located at an input side of the Faraday rotator, and the additional polarization splitter may be located at an output side of the Faraday rotator.

In a second aspect, embodiments of the invention provide a Faraday rotator for use in a silicon waveguide, the Faraday rotator comprising:
  one or more magnets for providing a magnetic field; and
  a silicon spiral delay line, the silicon spiral delay line formed from a silicon waveguide shaped into a spiral region having no in-built phase shifters and a central region within the spiral region, the central region having no more than a total of 180° of phase shifter.

The Faraday rotator may have any one, or any combination insofar as they are compatible, of the following optional features.

The one or more magnets may comprise two U-shaped magnets positioned in an opposing relationship to generate the magnetic field between their respective ends.

The central region may comprise two bends, each bend comprising a 90° phase shifter.

Each loop of the spiral region of the silicon spiral delay line may have a rectangle shape formed of four straight portions and four curved corners.

The one or more magnets may be positioned such that the field lines of the magnetic field follow the path of the waveguide within the spiral region.

Each loop of the spiral region of the silicon spiral delay line may have a rectangle shape formed of four straight portions and four curved corners, and the one or more magnets may comprise four magnets, each magnet being located at a corner of the rectangle shape.

The central region may comprise no phase shifters.

The silicon spiral delay line may be formed from a 3 μm silicon waveguide.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES OF THE INVENTION

This invention covers the configuration of silicon Faraday rotators and surrounding photonic integrated circuits.

Two configurations of the Faraday rotator are described below with reference to FIGS. 1 and 2.

Figure 1:
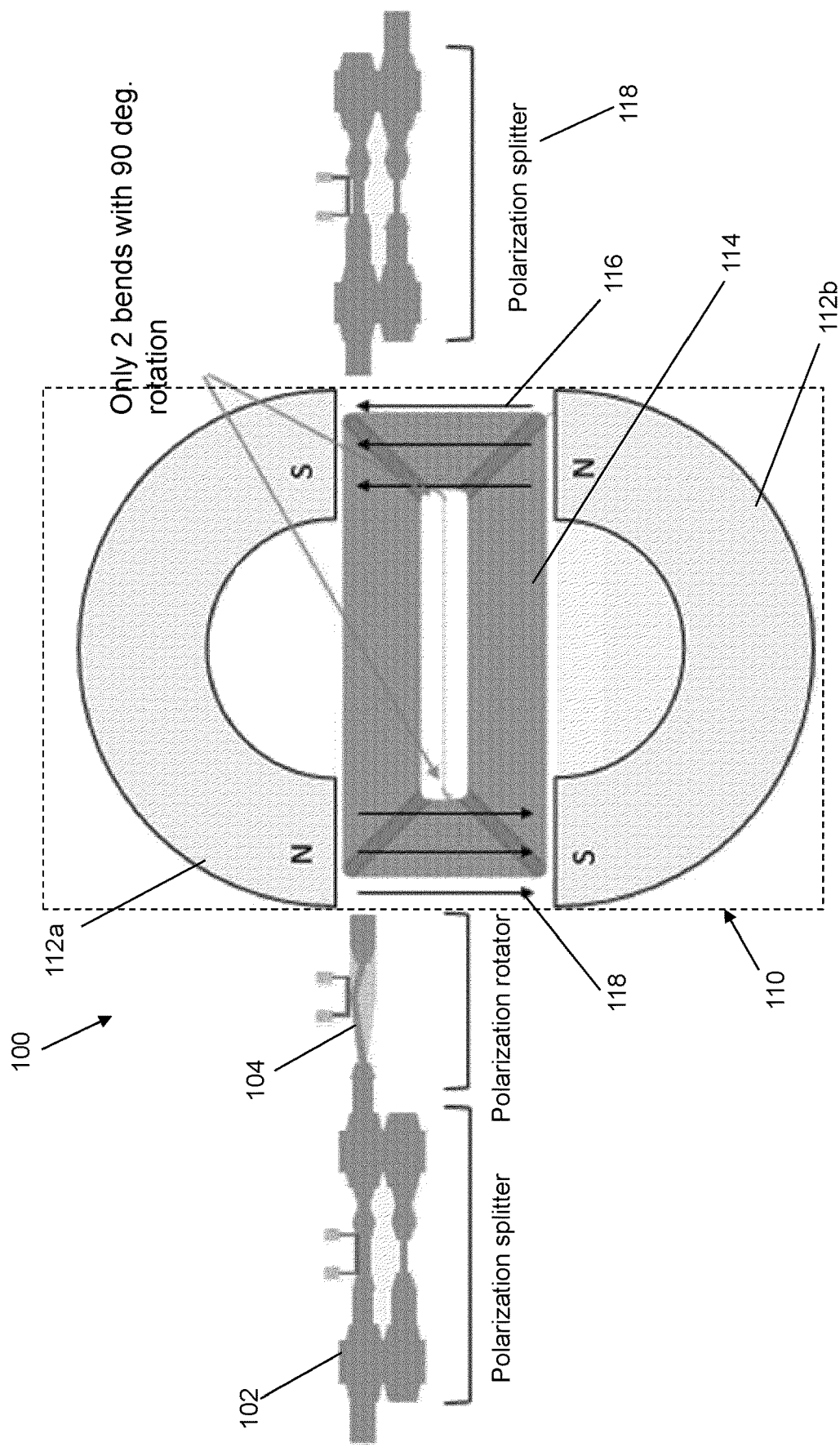
FIG. 1 shows a schematic diagram of an optical isolator with a Faraday rotator.

In the first Faraday rotator 110, included in the optical isolator 100 as shown in FIG. 1, the silicon spiral delay 114 line is placed within two U-shaped magnets 112a and 112b (or other arrangement of magnets that produces a similar field 116). This configuration only requires a 180 degree phase rotation (or two 90 degree rotations) in the middle of the spiral so that the Faraday rotation adds constructively. This greatly simplifies the design and the fabrication error on the single rotation element in the center is not limiting. The Faraday rotator 110 imparts a 45° rotation to the polarization of the signal, in a manner which is not reciprocal i.e. is not reversed if light is passed through the rotator in the opposite direction. The magnets may have a magnetic field strength of at least 0.1 Tesla and no more than 1 Tesla.

The Faraday rotator 110 is connected at either end to other components of the optical isolator 100. On a left hand side, and 'upstream' of the Faraday rotator, are a polarization splitter 102 and polarization rotator 104. In use, light enters the polarization splitter and is divided into transverse electric and transverse magnetic portions. A portion of the signal is then provided into the polarization rotator 104 which imparts a 45° rotation to the polarization of the signal. This rotation is reciprocal, i.e. it is reverse if light is passed through the rotator 104 in the opposite direction.

The combination of the Faraday rotator 110 and polarization rotator 104 is a 90° rotation in the polarization of the light as it is transferred into the second polarization splitter 118 on the right hand side of FIG. 1. As the rotation imparted by the Faraday rotator is nonreciprocal, the arrangement 110 functions as an optical isolator or optical diode as light can only pass from left to right. This is because light passing from right to left will be in an incorrect polarization state when it is received by the first polarization splitter 102, and so will be provided to a blanked output port.

Figure 2:
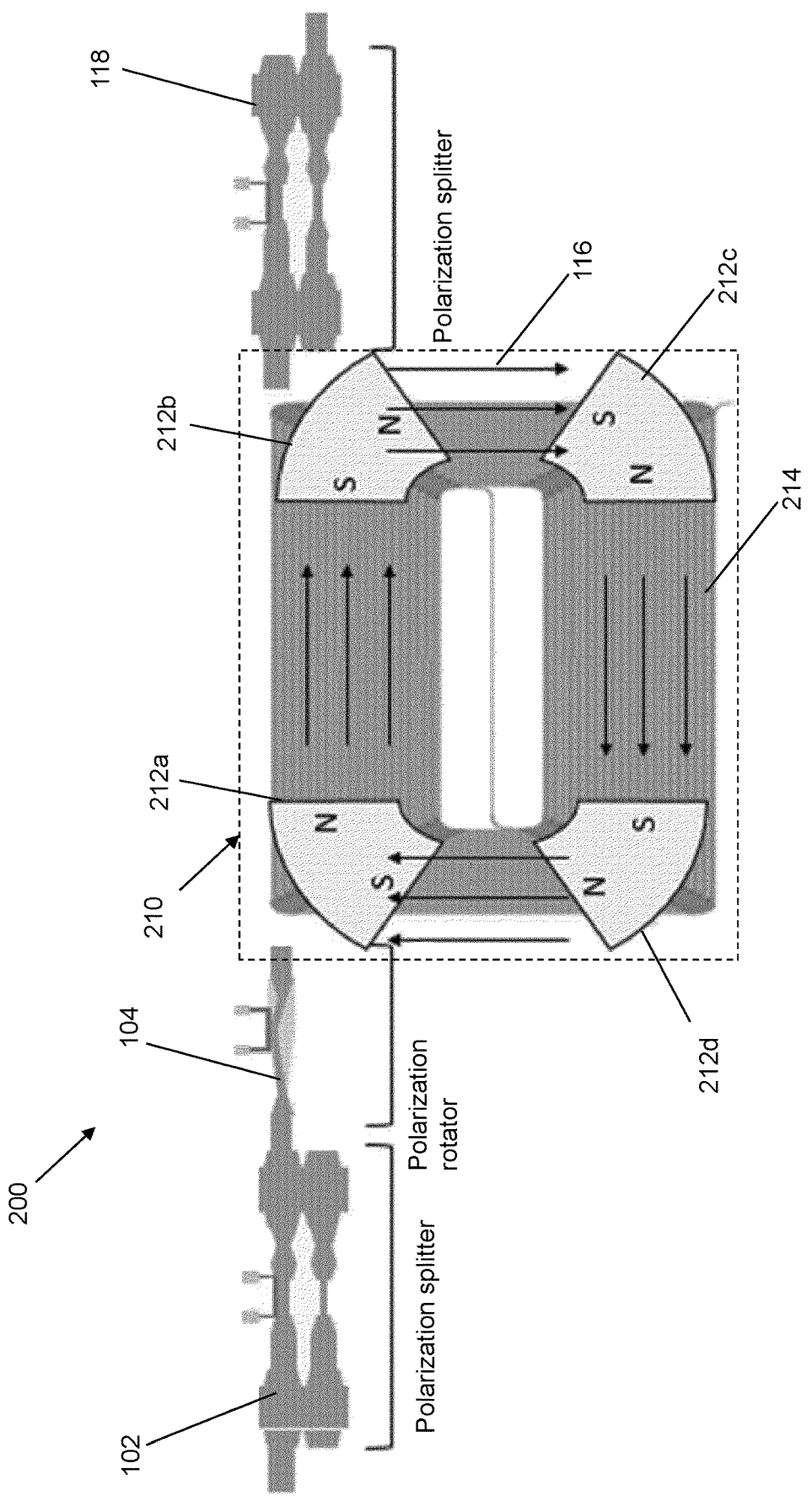
FIG. 2 shows a schematic diagram of an alternative optical isolator with a Faraday rotator.

In the second Faraday rotator 220, included in the optical isolator 200 as shown in FIG. 2, the silicon spiral delay line 214 is a regular spiral with no rotations in the center. Multiple magnets 212a-212d are placed around the spiral such that the magnetic field 116 follows the path of the waveguide. As before, the Faraday rotator 210 imparts a 45° rotation to the polarization of the signal in a manner which is not reciprocal. The magnets may have a magnetic field strength of at least 0.1 Tesla and no more than 1 Tesla.

The Faraday rotator 210 is connected at either end to other components of the optical isolator 200. On a left hand side, and 'upstream' of the Faraday rotator, are a polarization splitter 102 and polarization rotator 104. In use, light enters the polarization splitter and is divided into transverse electric and transverse magnetic portions. A portion of the signal is then provided into the polarization rotator 104 which imparts a 45° rotation to the polarization of the signal. This rotation is reciprocal, i.e. it is reverse if light is passed through the rotator 104 in the opposite direction.

The combination of the Faraday rotator 210 and polarization rotator 104 is a 90° rotation in the polarization of the light as it is transferred into the second polarization splitter 118 on the right hand side of FIG. 2. As the rotation imparted by the Faraday rotator is nonreciprocal, the arrangement 210 functions as an optical isolator or optical diode as light can only pass from left to right. This is because light passing from right to left will be in an incorrect polarization state when it is received by the first polarization splitter 102, and so will be provided to a blanked output port.

As has been discussed, both configurations are completed with two polarization splitters and one 45 degree polarization rotator.

This invention covers the described configurations for producing silicon faraday rotators with few or no 90-180 degree phase shifters and the surrounding silicon photonic integrated circuit to form optical isolators.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. An optical isolator on a silicon photonic integrated circuit, the optical isolator comprising:
    a polarization splitter;
    a polarization rotator; and
    a Faraday rotator,
    wherein the Faraday rotator comprises:
        one or more magnets for providing a magnetic field; and
        a silicon spiral delay line, the silicon spiral delay line formed from a silicon waveguide shaped into a spiral region having no built-in phase shifters and a central region within the spiral region, the central region having no more than a total of 180 degrees of phase shifters.

2. The optical isolator of claim 1, wherein the one or more magnets comprise two U-shaped magnets positioned in an opposing relationship to generate the magnetic field between their respective ends.

3. The optical isolator of claim 1, wherein the central region comprises two bends, each bend comprising a 90 degree phase shifter.

4. The optical isolator of claim 1, wherein each loop of the spiral region of the silicon spiral delay line has a rectangle shape formed of four straight portions and four curved corners.

5. The optical isolator of claim 1, wherein the one or more magnets are positioned such that the field lines of the magnetic field follow the path of the silicon waveguide within the spiral region.

6. The optical isolator of claim 5, wherein each loop of the spiral region of the silicon spiral delay line has a rectangle shape formed of four straight portions and four curved corners, and wherein the one or more magnets comprises four magnets, each magnet being located at a corner of the rectangle shape.

7. The optical isolator of claim 5, wherein the central region comprises no phase shifters.

8. The optical isolator of claim 1, wherein the silicon spiral delay line is formed from a 3 μm silicon waveguide.

9. The optical isolator of claim 1, wherein the polarization rotator is a 45 degrees polarization rotator.

10. The optical isolator of claim 1, comprising an additional polarization splitter.

11. The optical isolator of claim 10, wherein the polarization splitter is located at an input side of the Faraday rotator, and the additional polarization splitter is located at an output side of the Faraday rotator.

12. A Faraday rotator for use in a silicon waveguide platform, the Faraday rotator comprising:
one or more magnets for providing a magnetic field; and
a silicon spiral delay line, the silicon spiral delay line formed from a silicon waveguide shaped into a spiral region having no built-in phase shifters and a central region within the spiral region, the central region having no more than a total of 180 degrees of phase shifters.

13. The Faraday rotator of claim 12, wherein the one or more magnets comprise two U-shaped magnets positioned in an opposing relationship to generate the magnetic field between their respective ends.

14. The Faraday rotator of claim 12, wherein the central region comprises two bends, each bend comprising a 90 degree phase shifter.

15. The Faraday rotator of claim 12, wherein each loop of the spiral region of the silicon spiral delay line has a rectangle shape formed of four straight portions and four curved corners.

16. The Faraday rotator of claim 12, wherein the one or more magnets are positioned such that the field lines of the magnetic field follow the path of the silicon waveguide within the spiral region.

17. The Faraday rotator of claim 12, wherein each loop of the spiral region of the silicon spiral delay line has a rectangle shape formed of four straight portions and four curved corners, and wherein the one or more magnets comprises four magnets, each magnet being located at a corner of the rectangle shape.

18. The Faraday rotator of claim 16, wherein the central region comprises no phase shifters.

19. The Faraday rotator of claim 12, wherein the silicon spiral delay line is formed from a 3 µm silicon waveguide.

20. The optical isolator of claim 1, wherein, for light propagating from a first end of the spiral delay line to a second end of the spiral delay line, the magnets are positioned to provide:
a Faraday rotation, at a first side of a loop of the spiral region, that is clockwise along the direction of propagation of the light at the first side of the loop, and
a Faraday rotation at a second side of the loop, opposite the first side, that is clockwise along the direction of propagation of the light at the second side of the loop.

\* \* \* \* \*